United States Patent [19]
Willson

[11] Patent Number: 4,802,507
[45] Date of Patent: Feb. 7, 1989

[54] GAS FLOW CONTROL DEVICE
[75] Inventor: James R. Willson, Ashland, Mass.
[73] Assignee: Kidde, Inc., Saddle Brook, N.J.
[21] Appl. No.: 46
[22] Filed: Jan. 2, 1987
[51] Int. Cl.[4] ............................................. F16K 31/126
[52] U.S. Cl. ................................. 137/613; 137/505.12
[58] Field of Search .................... 137/505.12, 509, 510, 137/613

[56] References Cited

U.S. PATENT DOCUMENTS

| | | | |
|---|---|---|---|
| 3,323,535 | 6/1967 | Klemm et al. | 137/505.12 X |
| 3,688,486 | 5/1963 | Salmon et al. | 137/505.12 X |
| 4,044,794 | 8/1977 | Matthews | 137/613 |
| 4,168,719 | 9/1979 | Neushaw | 137/613 X |

FOREIGN PATENT DOCUMENTS 2358845  6/1975  Fed. Rep. of Germany ...... 137/613

Primary Examiner—A. Michael Chambers
Assistant Examiner—John C. Fox
Attorney, Agent, or Firm—John E. Toupal; Harold G. Jarcho

[57] ABSTRACT

A gas flow control device including a body means defining an inlet, an outlet and a gas flow passage therebetween a main valve disposed in the passage and comprising a primary valve movable between a closed position that prevents flow through the passage and an open position that permits flow therethrough; a primary diaphragm operably connected to the primary valve and supported by the body means, the primary diaphragm defining within the body and separating a primary reference chamber from a primary regulator chamber located in the passage and the pressure in the primary reference chamber exerting a force tending to open the primary valve; and a primary bias means biasing the primary valve toward its open position. Also included in the device is a secondary valve disposed in the passage between the primary valve and the outlet, the secondary valve movable between a closed position that prevents flow through the passage and an open position that permits flow therethrough; a secondary diaphragm operably connected to the secondary valve and supported by the body, the secondary diaphragm defining with the body and separating a secondary reference chamber from a secondary regulator chamber located in the passage and the pressure in the secondary regulator chamber exerting a force tending to close the secondary valve; a secondary bias means biasing the secondary valve toward the open position and a control passage providing communication between the primary reference chamber and the outlet.

25 Claims, 1 Drawing Sheet

GAS FLOW CONTROL DEVICE

BACKGROUND OF THE INVENTION

This application relates generally to a gas flow control device and, more particularly, to such a device in which full rated flow is preceded by a period of reduced flow that effects limited combustion in a burner.

The safe operation of many gas burners, particularly those enclosed in relatively compact combustion chambers, requires a start-up period of reduced gas flow preceding full rated flow. During the period of reduced flow, there is developed sufficient draft through the combustion chamber to support combustion of the subsequent full rated flow.

There have been developed and proposed various gas flow control devices, commonly known as stepped opening or slow opening valves that can delay full rated gas flow to a burner. Although many of these devices effectively accomplish the desired delay in full rated flow, they suffer from a number of individual and collective disadvantages including, for example, critical operation characteristics and high construction costs. Examples of stepped opening valves are disclosed in U.S. Pat. Nos. 3,300,174; 3,386,467; 3,351,085; 3,354,901; 3,502,101; 3,552,430; 3,578,243; 3,721,263; 3,776,268; 3,800,823; 3,880,186; 3,896,857; 4,009,861; 4,060,370; 4,217,928 and 4,254,796.

The object of this invention, therefore, is to provide an improved, relatively low cost gas flow control device that efficiently provides an initial period of reduced gas flow preceding full rated gas flow.

SUMMARY OF THE INVENTION

The invention is a gas flow control device including a body means defining an inlet, an outlet and a gas flow passage therebetween a main valve disposed in the passage and comprising a primary valve movable between a closed position that prevents flow through the passage and an open position that permits flow therethrough; a primary diaphragm operably connected to the primary valve and supported by the body means, the primary diaphragm defining with the body and separating a primary reference chamber from a primary regulator chamber located in the passage and the pressure in the primary reference chamber exerting a force tending to open the primary valve; and a primary bias means biasing the primary valve toward its open position. Also included in the device is a secondary valve disposed in the passage between the primary valve and the outlet, the secondary valve movable between a closed position that prevents flow through the passage and an open position that permits flow therethrough; a secondary diaphragm operably connected to the secondary valve and supported by the body, the secondary diaphragm defining with the body and separating a secondary reference chamber from a secondary regulator chamber located in the passage and the pressure in the secondary regulator chamber exerting a force tending to close the secondary valve; a secondary bias means biasing the secondary valve toward the open position and a control passage providing communication between the primary reference chamber and the outlet. During a start-up period the primary valve regulates outlet pressure at a reduced pressure while gas flow between the outlet and the primary reference chamber provides a subsequent increase in the outlet pressure.

According to one feature of the invention the control passage comprises a check valve providing restricted flow from the outlet to the primry reference chamber and full flow from the primary reference chamber to the outlet. The restricted flow through the check valve controls the increase in outlet pressure while the full flow permits rapid dumping of the primary reference chamber after shut-off.

According to other features of the invention, the device further includes a primary actuator coupled to the main valve and operable in a first state to prevent flow therethrough and operable in a second state to permit flow therethrough, and a secondary actuator coupled to the secondary valve and operable in one state to prevent flow therethrough and operable in another state to permit flow therethrough. The primary and secondary actuators permit control of the device by a thermostat.

According to one embodiment of the invention, the main valve comprises an auxiliary valve disposed in the passage between the inlet and the primary valve and the device further includes an actuator coupled to the auxiliary valve and operable in a first state to prevent flow therethrough and operable in a second state to permit flow therethrough. The auxiliary valve facilitates rapid opening of the device by permitting the primary valve to remain open during shut-off.

According to another embodiment of the invention, the device includes a vent valve connected between atmosphere and the primary reference chamber and adapted to normally vent the primary reference chamber and to close and allow a pressure increase therein in response to movement of the main valve to the open position. The vent valve facilitates rapid cycling of the device by both bleeding off pressure from the primary reference chamber and preventing the existence of a vacuum therein during quick re-starts of gas flow.

DESCRIPTION OF THE DRAWINGS

These and other objects and features of the invention will become more apparent upon a perusal of the following description taken in conjunction with the accompanying drawings wherein.

DESCRIPTION OF THE PREFERRED EMBODIMENT

Figure 1:
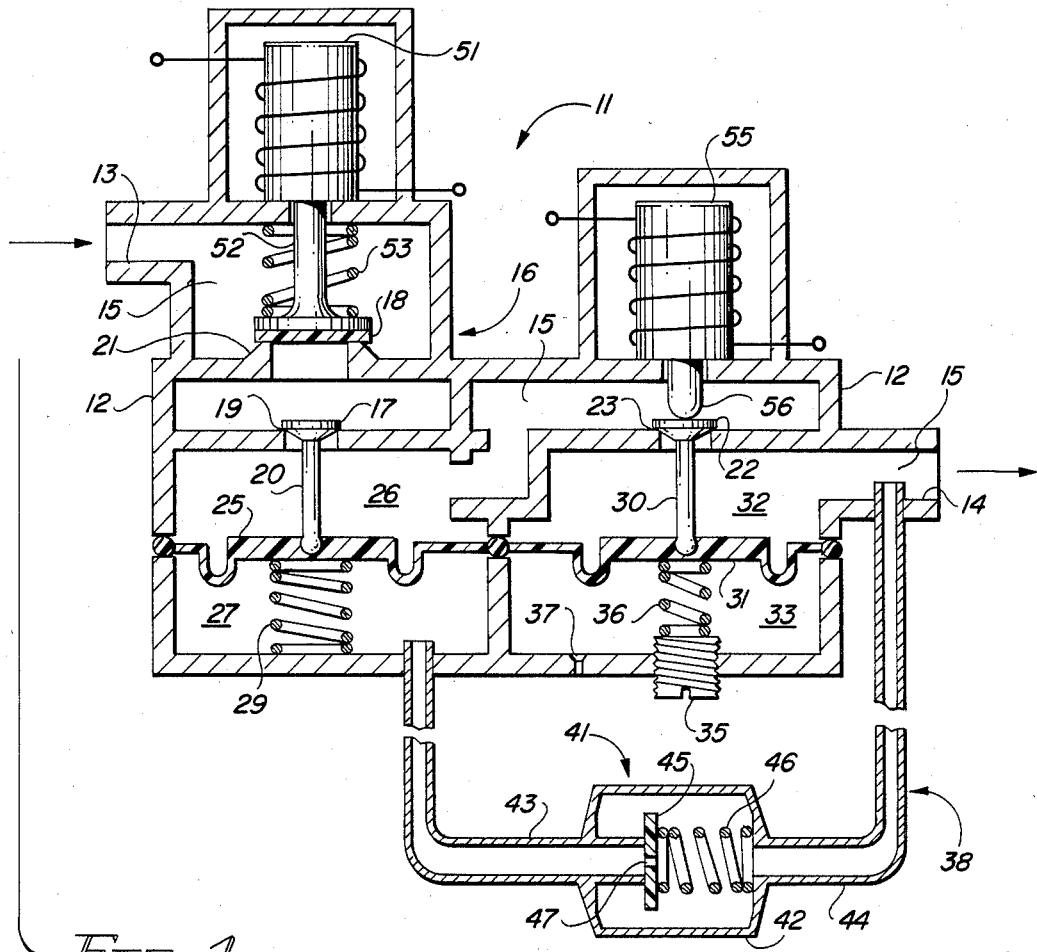
FIG. 1 is a schematic cross sectional view of a gas flow control device in accordance with the present invention.

Constructed in accordance with one embodiment of the invention is a gas flow control device 11 shown in FIG. 1. A casing body 12 defines an inlet 13 for connection to a source of gas, an outlet 14 for connection to a combustion burner and a gas flow passage 15 therebetween. Disposed within the passage 15 for controlling gas flow therethrough is a main valve 16 assembly including a primary valve 17 and an auxiliary valve 18. The series connected primary valve 17 and auxiliary valve 18 are accommodated, respectively, by valve seats 19 and 21 defined by the body 12. Also disposed in the gas flow passage 15 between the primary valve 17 and the outlet 14 is a secondary valve 22 accommodated by a valve seat 23.

Operably connected to a stem 20 of the primary valve 17 is a primary diaphragm 25 retained by the body 12.

Together the primary diaphragm 25 and the body 12 define a primary regulator chamber 26 within the gas flow passage 15 and a primary reference chamber 27 separated therefrom by the primary diaphragm 25. In response to pressure induced movement of the diaphragm 25, the primary valve 17 is moved between a closed position engaging the seat 19 and preventing gas flow through the passage 15 and an open position permitting gas flow therethrough. A primary bias spring 29 extends between the body 12 and the primary diaphragm 25 and exerts thereon a force tending to open the primary valve 17.

Operatively connected to a stem 30 of the secondary valve 22 and supported by the body 12 is a secondary diaphragm 31. Together the body 12 and the secondary diaphragm 31 define a secondary regulator chamber 32 disposed in the flow passage 15 and a secondary reference chamber 33 separated therefrom by the secondary diaphragm 31. In response to pressure induced movement of the secondary diaphragm 31, the secondary valve 22 is moved between a closed position engaging the seat 23 and preventing gas flow through the flow passage 15 and an open position permitting flow therethrough. Extending between the secondary diaphragm 31 and an adjustable threaded plug 35 in the body 12 is a secondary bias spring 36. Produced on the secondary diaphragm 31 by the secondary bias spring 36 is a force tending to open the secondary valve 22. Atmospheric pressure is maintained in the secondary reference chamber 33 by a vent orifice 37.

A control passage 38 has one end communicating with the outlet 14 and an opposite end communicating with the primary reference chamber 27. Located in the control passage 38 is an assembly 41 for controlling pressure within the primary reference chamber 27. An enclosure 42 joins a section 43 of the control passage 38 connected to the primary reference chamber 27 and a section 44 connected to the outlet 14. Retained by the enclosure 42 is a check valve 45 urged by a bias spring 46 toward a closed position that closes the section 43. Extending centrally through the check valve 45 is a restriction orifice 47.

A primary solenoid actuator 51 has a plunger 52 coupled to the auxiliary valve 18. In a first deenergized state of the primary solenoid 51, the plunger 52 retains the auxiliary valve 18 in a closed position to prevent gas flow through the passage 15. In a second energized state of the solenoid 51, the plunger 52 is withdrawn allowing opening of the auxiliary valve 18 to permit flow to the passage 15. A secondary solenoid actuator 55 has a plunger 56 operatively coupled to the secondary valve 22. In one deenergized state of the solenoid 55, the plunger 56 retains the secondary valve 22 in a closed position to prevent fuel gas flow through the passage 15. In another energized state of the solenoid 55 the plunger is withdrawn to permit opening of the secondary valve 22 by the secondary spring 36 and the secondary diaphragm 31.

OPERATION

In the absence of a call for gas at a burner (not shown) connected to the outlet 14, the deenergized primary solenoid 51 and secondary solenoid 55, respectively, retain the auxiliary valve 18 and the secondary valve 22 in closed positions that prevent gas flow through the flow passage 15. At such time, the same atmospheric pressure exists in the primary flow chamber 26 and the primary reference chamber 27 and the primary spring 29 retains the primary valve 17 in an open position.

Upon a call for gas, the primary solenoid 51 and secondary solenoid 55 are energized to withdraw, respectively, the plungers 52 and 56 and thereby open the auxiliary valve 18 against the spring 53 and permit opening of the secondary valve 22 by the secondary spring 36. Resultant gas flow from the inlet 13 through the open auxiliary and primary valves 18, 17 increases the pressure in the primary regulation chamber 26. In response thereto, the primary diaphragm 25 and the primary spring 29 function as a regulator to maintain a given pressure in the chamber 26. For example, the primary diaphragm 25 and the primary spring 29 can be selected to provide a given initial pressure in the primary flow chamber 26 of approximately 1½ inches water column (W.C.). The secondary valve 22 also is controlled by the secondary diaphragm 31 and the secondary spring 36 to regulate pressure in the secondary regulator chamber 32. Preferably the secondary diaphragm 31 and the secondary spring 36 are selected to limit the pressure in the secondary regulator chamber 32 to a predetermined greater pressure of, for example, 3½ inches W.C. Thus, the initial given pressure in the primary flow chamber 26 less any line pressure drop is transmitted by the secondary valve 22 to the outlet 14.

Gas at the outlet 14 is fed to both a connected burner (not shown) and the primary reference chamber 27 through the control passage 38 and the restriction orifice 47 in the check valve 45. Resultant increasing pressure in the primary reference chamber 27 increases the opening force applied by the primary diaphragm 25 to the primary valve 17 causing the pressure to increase in the primary flow chamber 26 and correspondingly at the outlet 14. The outlet pressure increases until approximately 3½ inches W.C. is reached and retained by the secondary valve 22. At that time, the pressure in the primary regulator chamber 26 and the inlet to the secondary valve 22 is maintained at a pressure determined by the combined forces applied to the primary diaphragm 25 by the primary bias spring 29 and the pressure then existing in the primary reference chamber 27. For the example given above, that operating pressure in the primary regulator chamber 26 will approximate 5 inches W.C.

Any subsequent deenergization of the primary solenoid 51 and the secondary solenoid 55 results in closure of the auxiliary valve 18 and the secondary valve 22 to interrupt gas flow between the inlet 13 and the outlet 14. The check valve 45 responds to the difference in pressure between the primary reference chamber 27 and the outlet 14 by moving against the spring 46 to open the section 43 of the control passage 38. Accordingly, gas pressure in the primary regulator chamber 27 is quickly dumped into the outlet 14 to reestablish atmospheric pressure within the primary reference chamber 27. The return to atmospheric pressure in the primary reference chamber 26 allows the primary spring 29 to maintain the primary valve 17 in an open position prepared for a reopening of the auxiliary valve 18.

Figure 2:
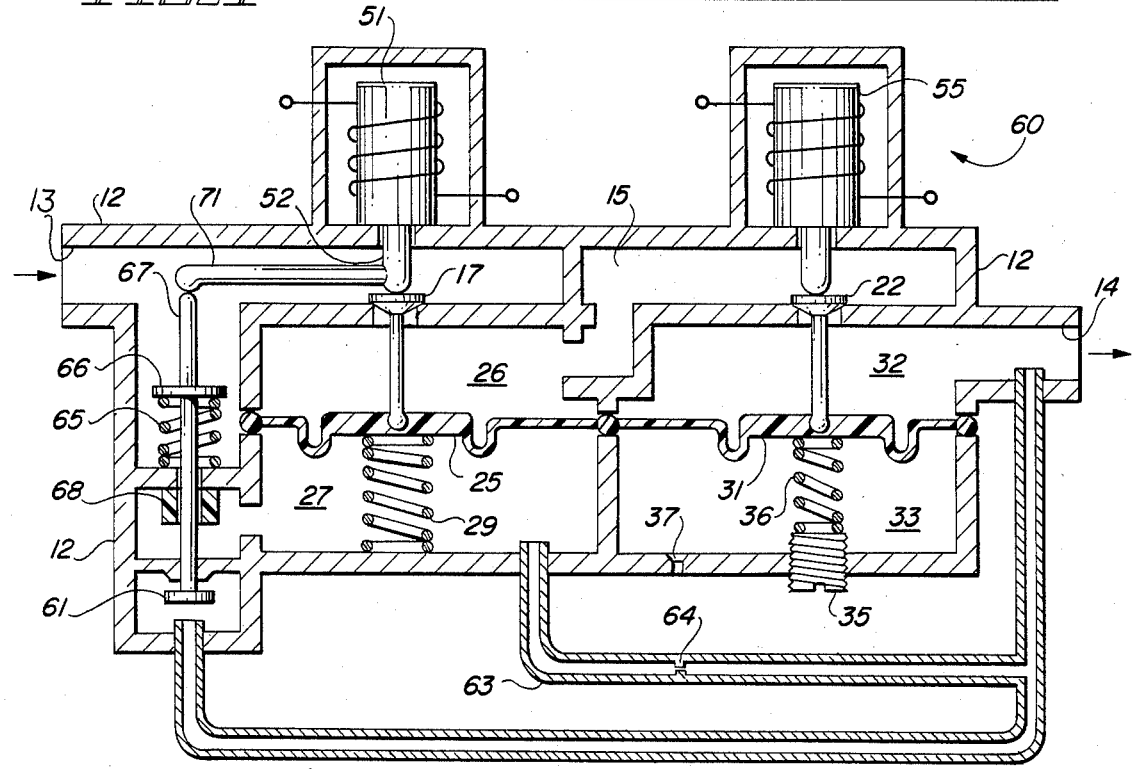
FIG. 2 is a schematic fragmentary cross sectional view of another embodiment of the device shown in FIG. 1.

Illustrated in FIG. 2 is another embodiment 60 in which parts identical to those of the embodiment 11 shown in FIG. 1 bear the same reference numerals. In the embodiment 60, the check valve 41 and the auxiliary valve 18 of FIG. 1 are replaced by a vent valve 61 connected between the primary reference chamber 27 and the outlet 14 by a vent passage 62. Also, the plunger 52 of the primary solenoid actuator 51 is coupled directly to the primary valve 17 and the primary reference chamber 27 communicates with the outlet 14 via a control passage 63 having a restriction orifice 64. A spring 65 extends between the body 12 and a skirt 66 on a stem 67 of the valve 61. The spring 65 exerts a closure force on the valve 61 and an annular seal 68 prevents flow between the inlet 13 and the primary reference chamber 27. Operatively connecting the vent valve 61 to the solenoid 51 is an arm 71 mechanically coupled between the plunger 52 and the valve stem 67. The coupling between the primary solenoid 51 and the vent valve 61 is such that in response to a call for gas, the secondary valve 22 and the primary valve 17 are opened after which the vent valve 61 is closed.

Operation of the embodiment 60 is similar to that described for the embodiment 11. However, in the absence of the check valve 41, the vent valve 61 functions to relieve pressure in the primary reference chamber 27 after closing of the primary valve 17 and thereby permit a rapid recycling thereof. In addition, the open vent valve 61 facilitates opening of the primary valve 17 by preventing an initial vacuum in the primary reference chamber 27. Subsequent closing of the vent valve 61 permits a gradual pressure increase in the primary reference chamber 27 via the restricted orifice 64 in the control passage 63. Thus, the restricted orifice 64 and the vent valve 61 provide for the embodiment of FIG. 2 a stepped flow operation similarly provided in the embodiment of FIG. 1 by the check valve 41.

Obviously, many modifications and variations of the present invention are possible in light of the above teachings. It is to be understood, therefore, that the invention can be practiced otherwise than as specifically described.

What is claimed:

1. A gas flow control device comprising:
   a body means defining an inlet, an outlet, and a gas flow passsage therebetween;
   a main valve means disposed in said flow passage and comprising a primary valve movable between a closed position that prevents flow through said flow passage and an open position that permits flow therethrough;
   a primary diaphragm operably connected to said primary valve and supported by said body means, said primary diaphragm defining with said body means and separating a primary reference chamber from a primary regulator chamber located in said flow passage; pressure in said primary reference chamber exerting a force tending to open said primary valve;
   a primary bias means biasing said primary valve toward said open position;
   a secondary valve disposed in said flow passage between said primary valve and said outlet, said secondary valve movable between a closed position that prevents flow through said flow passage and an open position that permits flow therethrough;
   a secondary diaphragm operably connected to said secondary valve and supported by said body means, said secondary diaphragm defining with said body means and separating a secondary reference chamber from a secondary regulator chamber located in said flow passage, pressure in said secondary regulator chamber exerting a force tending to close said secondary valve;
   a secondary bias means biasing said secondary valve toward said open position; and
   control passage means including a gas flow restriction providing restricted gas flow between said primary reference chamber and said outlet, said control passage means adapted to transmit to said primary reference chamber changes in the gas pressure at said outlet after a substantial delay provided by said gas flow restriction.

2. A device according to claim 1 wherein said control passage means comprises a valve means providing said restricted flow from said outlet to said primary reference chamber and full flow from said primary reference chamber to said outlet.

3. A device according to claim 2 including primary actuator means coupled to said main valve and operable in a first state to prevent flow therethrough and operable in a second state to permit flow therethrough.

4. A device according to claim 3 including a secondary actuator means coupled to said secondary valve and operable in one state to prevent flow therethrough and operable in another state to permit flow therethrough.

5. A device according to claim 1 wherein said primary bias means and said primary diaphragm are adapted in response to initial flow between said inlet and said primary regulator chamber to limit the pressure therein to a given level and to provide a stepped increase in the pressure therein in response to a delayed increase in pressure in said primary reference chamber produced by gas flow thereto through said control passage from said outlet.

6. A device according to claim 5 wherein said secondary bias and said secondary diaphragm are adapted to limit the pressure in said secondary regulator chamber to a predetermined level greater than said given level.

7. A device according to claim 6 wherein said secondary reference chamber is vented to the atmosphere.

8. A device according to claim 6 wherein said control passage means comprises a check valve means providing said restricted flow from said outlet to said primary reference chamber and full flow from said primary reference chamber to said outlet.

9. A device according to claim 1 wherein said main valve further comprises an auxiliary valve disposed in said flow passage between said inlet and said primary valve.

10. A device according to claim 9 including an actuator means coupled to said auxiliary valve and operable in a first state to prevent flow therethrough and operable in a second state to permit flow therethrough.

11. A device according to claim 1 wherein said control passage means comprises a restricted passage and including vent means for venting said primary reference chamber after movement of said main valve means into said closed position.

12. A device according to claim 11 wherein said vent means comprises a normally open vent valve between atmosphere and said primary reference chamber, said vent valve closing in response to movement of said main valve to said open position.

13. A device according to claim 12 including primary actuator means coupled to said main valve and operable in a first state to prevent flow therethrough and operable in a second state to permit flow therethrough.

14. A device according to claim 13 wherein said vent valve comprises operator means responsive to a change in said primary actuator from said first state to said second state.

15. A device according to claim 14 wherein said primary bias means and said primary diaphragm are adapted in response to initial flow between said inlet and said primary regulator chamber to limit the pressure therein to a given level and to permit an increase in the pressure therein in response to increased pressure in said primary reference chamber produced by flow thereto from said outlet.

16. A device according to claim 15 wherein said secondary bias and said secondary diaphragm are adapted to limit the pressure in said secondary flow chamber to a predetermined level greater than said given level.

17. A device according to claim 11 wherein said primary bias means and said primary diaphragm are adapted in response to initial flow between said inlet and said primary regulator chamber to limit the pressure therein to a given level and to permit an increase in the pressure therein in response to increased pressure in said primary reference chamber produced by flow thereto from said outlet.

18. A device according to claim 17 wherein said secondary bias and said secondary diaphragm are adapted to limit the pressure in said secondary regulator chamber to a predetermined level greater than said given level.

19. A gas flow control device comprising:
a body means defining an inlet, an outlet, and a gas flow passage therebetween;
a main valve means disposed in said passage and comprising a primary valve movable between a closed position that prevents flow through said passage and an open position that permits flow therethrough;
a primary diaphragm operably connected to said primary valve and supported by said body means, said primary diaphragm defining with said body means and separating a primary reference chamber from a primary regulator chamber located in said passage, pressure in said primary reference chamber exerting a force tending to open said primary valve;
a primary bias means biasing said primary valve toward said open position;
a secondary valve disposed in said passage between said primary valve and said outlet, said secondary valve movable between a closed position that prevents flow through said passage and an open position that permits flow therethrough;
a secondary diaphragm operably connected to said secondary valve and supported by said body means, said secondary diaphragm defining with said body means and separating a secondary reference chamber from a secondary regulator chamber located in said passage, pressure in said secondary regulator chamber exerting a force tending to close said secondary valve;
a mechanical secondary bias means coupled to said secondary valve and applying thereto a mechanical force biasing said secondary valve toward said open position said secondary bias means being manually adjustable so as to permit selective variation in the mechanical force applied to said secondary valve; and
control passage means providing communication between said primary reference chamber and said outlet, said control passage means including a gas flow restriction providing restricted gas flow between said primary reference chamber and said outlet and adapted to transmit to said primary reference chamber changes in the gas pressure at said outlet after a substantial delay provided by said gas flow restriction.

20. A device according to claim 19 wherein said secondary bias and said secondary diaphragm are adapted to limit the pressure in said secondary regulator chamber to a predetermined level greater than said given level.

21. A device according to claim 20 wherein said secondary reference chamber is vented to the atmosphere.

22. A device according to claim 19 wherein said secondary reference chamber is hermetically sealed from said gas flow passage so as to prevent the flow of gas therebetween.

23. A device according to claim 19 wherein said primary bias means and said primary diaphragm are adapted in response to initial flow between said inlet and said primary regulator chamber to limit the pressure therein to a given level and to provide a stepped increase in the pressure therein in response to a delayed increase in pressure in said primary reference chamber produced by gas flow thereto through said control passage and from said outlet.

24. A device according to claim 23 wherein said secondary bias and said secondary diaphragm are adapted to limit the pressure in said secondary regulator chamber to a predetermined level greater than said given level.

25. A device according to claim 24 wherein said secondary reference chamber is vented to the atmosphere.

* * * * *